US010367237B2

(12) United States Patent
Landry et al.

(10) Patent No.: US 10,367,237 B2
(45) Date of Patent: Jul. 30, 2019

(54) BATTERY CALIBRATION

(71) Applicant: HEWLETT-PACKARD DEVELOPMENT COMPANY, L.P., Houston, TX (US)

(72) Inventors: John Landry, Houtson, TX (US); Chih-Ping (Tom) Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 15/540,040

(22) PCT Filed: Feb. 6, 2015

(86) PCT No.: PCT/US2015/014879
§ 371 (c)(1),
(2) Date: Jun. 27, 2017

(87) PCT Pub. No.: WO2016/126268
PCT Pub. Date: Aug. 11, 2016

(65) Prior Publication Data
US 2017/0338528 A1 Nov. 23, 2017

(51) Int. Cl.
H01M 10/48 (2006.01)
H01M 10/42 (2006.01)
H02J 7/00 (2006.01)
H01M 10/44 (2006.01)

(52) U.S. Cl.
CPC ......... *H01M 10/484* (2013.01); *H01M 10/42* (2013.01); *H01M 10/486* (2013.01); *H02J 7/0047* (2013.01); *H01M 10/446* (2013.01); *H02J 2007/005* (2013.01); *H02J 2007/0049* (2013.01)

(58) Field of Classification Search
CPC ............... H01M 10/484; H01M 10/486
USPC ......................................... 429/91
See application file for complete search history.

(56) References Cited

U.S. PATENT DOCUMENTS 6,691,049 B1    2/2004  Jeansonne et al.
6,892,146 B2    5/2005  Tung
2002/0144160 A1 10/2002 Odaohhara et al.
(Continued)

FOREIGN PATENT DOCUMENTS

CN         103823191       5/2014

OTHER PUBLICATIONS

"State of Charge (SOC) Determination"; Aug. 3, 2004; 7 pages.
(Continued)

Primary Examiner — Bryan D. Ripa
Assistant Examiner — James M Erwin
(74) Attorney, Agent, or Firm — HPI Patent Department

(57) ABSTRACT

According to an example, a charge level of a battery detected with a processing resource communicatively coupled to the battery. In response to detecting a battery at full charge, the current full charge capacity of the battery is recorded, and an error cycle count, a design cycle count, and a full charge capacity at a last calibration are fetched. A maximum allowable battery decay level is calculated based on the error cycle count, the design cycle count, and the full charge capacity at last calibration. In an example, in the event that the current full charge capacity is less than the full charge capacity at the last calibration minus the maximum allowable battery decay level, a battery calibration alert is triggered.

15 Claims, 3 Drawing Sheets

(56) References Cited

U.S. PATENT DOCUMENTS

| | | |
|---|---|---|
| 2005/0127877 A1 | 6/2005 | Tsuchiya et al. |
| 2009/0171598 A1 | 7/2009 | Nakashima et al. |
| 2011/0154005 A1 | 6/2011 | Landry et al. |
| 2012/0274280 A1 | 11/2012 | Yip et al. |
| 2013/0066573 A1* | 3/2013 | Bond .................. G01R 31/392 |
| | | 702/63 |
| 2013/0101874 A1 | 4/2013 | Pevear |
| 2014/0320089 A1* | 10/2014 | Wang .................... H02J 7/007 |
| | | 320/157 |

OTHER PUBLICATIONS

Dong, T. et al.; "Research on High-precision Data Acquisition and SOC Calibration Method for Power Battery"; Sep. 3-5, 2008; 5 pages.

* cited by examiner

BATTERY CALIBRATION

BACKGROUND

Electronic devices in the consumer, commercial, and industrial sectors often run on portable power supplied through various battery technologies. With some battery technologies, calibration of the battery may be desired in order to achieve optimal performance of the battery.

DETAILED DESCRIPTION

Various embodiments described below provide for improving and optimizing battery performance by providing a battery calibration alert to a user. For example, if an actual battery decay level is detected as being greater than an expected or allowable battery decay level under a set of circumstances, a user of the battery may be prompted to run a calibration of the battery.

Users of electronic devices such as laptop computers, tablets, mobile devices, and other portable devices (hereinafter "device" or "devices") rely heavily on the performance and reliability of the battery installed in or coupled to the device. As the processing, display, and other resource demands of devices continue to grow, battery performance has become an even more important factor in device usability and reliability.

While performance expectations of batteries continue to increase, the trend so reducing device size, form factor, and cost has resulted in the expectation of thinner and lower cost batteries. As one example, some lithium-ion (LiION) batteries now ship without a fuel gauge or similar "smart" battery circuitry.

Although not including a fuel gauge or similar circuitry in a battery may reduce battery size or cost, a system coupled to the battery may not receive valuable information relating to the battery, which may result in an inaccuracy between the chemical state of the battery and the digital system used to report, for example, the maximum capacity, remaining charge, or charge state of the battery. For example, a digital meter or indicator may display more charge than what actually remains in the battery. Further, as the battery capacity naturally decays over time, the inaccuracy or "gap" may increase.

To provide a more accurate estimate of remaining power in a battery to a user, calibration of the battery may be desired. With some battery technologies, calibration may include fully discharging and charging the battery. However, a device or battery manufacturer, or a user, may desire for calibration to occur only it a battery has decayed more than a certain amount before a full charge and discharge cycle has occurred.

According, to an example, a charge level of a battery is detected with a processing resource communicatively coupled to the battery. In response to detecting a battery at full charge, the current full charge capacity of the battery is recorded, and an error cycle count, a design cycle count, and a full charge capacity at a last calibration are fetched. A maximum allowable battery decay level before calibration is needed or suggested is calculated based on the error cycle count, the design cycle count, and the full charge capacity at last calibration. In an example, in the event that the current full charge capacity is less than the full charge capacity at the last calibration minus the maximum allowable battery decay level before calibration, a battery calibration alert is triggered.

Figure 1:
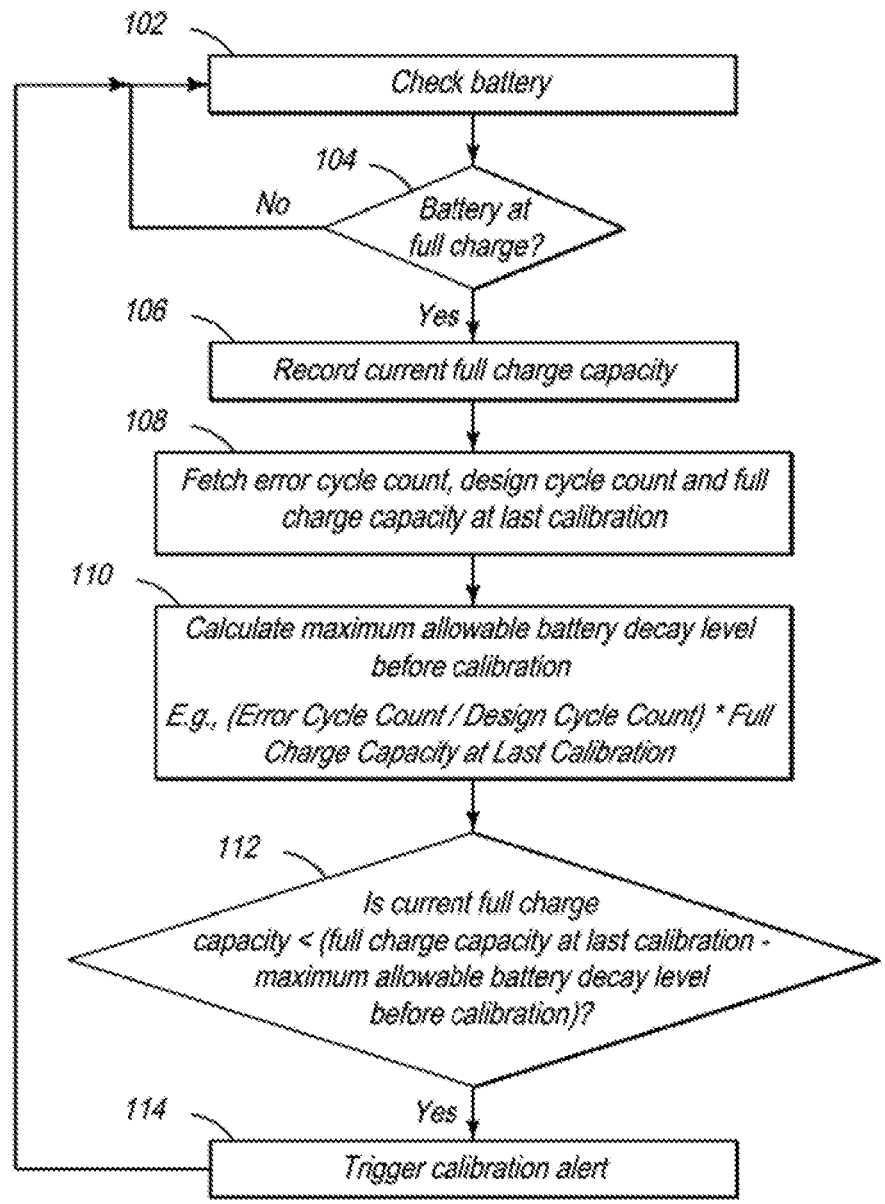
FIG. 1 is a flowchart for calculating a maximum allowable battery decay level before calibration and triggering a calibration alert, according to an example of the present disclosure.

FIG. 1 is a flowchart for calculating a maximum allowable battery decay level before calibration and triggering a calibration alert, according to an example of the present disclosure.

In block 102, a battery charge is checked, measured, tested, or otherwise detected by, for example, a power management integrated circuit ("PMIC") or similar component, module, processor, or processing resource. As discussed below in more detail, a PMIC may reside on or be integrated into a device coupled to a battery.

In block 104, a determination may be made as to whether the battery is at a full charge. If the battery is not at a full charge, flow may return to block 102, where the process may loop until the battery is fully charged.

In block 106, if the determination of block 104 indicates that the battery is at full charge, the current full charge capacity of the battery may be measured recorded. In various examples, the current full charge capacity of the battery may be recorded into a local memory, such as RAM communicatively coupled to, for example, PMIC or other processor. In some examples, the full charge capacity may be rated or recorded in milli-ampere hours ("mAh").

In block 108, an error cycle count, a design cycle count, and a full charge capacity at last calibration may be fetched. In some examples, the error cycle count, design cycle count, and full charge capacity at last calibration may be stored on a memory communicatively coupled to, for example, a PMIC or other processor.

In some examples, an error cycle count may be the number of battery charge and discharge cycles needed to reach a threshold nominal error, such as a 10% nominal error. The nominal error may be defused, for example, by a PMIC specification. In some examples, a design cycle count may be defined by a battery specification or battery manufacturer, and may represent the number of expected charge and discharge cycles for a battery prior to a battery's end of usable life.

In block 110, a maximum allowable or expected battery decay level before a calibration is needed or suggested (herein simply "maximum allowable decay level") may be calculated. For example, if a battery's last full charge capacity is measured at 5000 mAh, calibration may not be needed until the battery decays such that the current full charge capacity is below 4600 mAh, e.g., the maximum allowable battery decay level before calibration in such an example would be 499 mAh.

In block 110, a calculation may be performed to calculate the allowable decay level. In one example, the error cycle count may be divided by the design cycle count, with the result multiplied by the full charge capacity at last calibration. For example, an error cycle count of 40 may be divided by a design cycle count of 500, and multiplied by a full charge capacity at last calibration of 5000 mAh to result in a maximum allowable decay level of 400 mAh.

In block 112, a determination may be made as to whether a battery calibration is needed or suggested. In an example, if the current full charge capacity is less than the full charge capacity at last calibration minus the maximum allowable decay level, flow may proceed to block 114 where a calibration may be performed, or where a calibration alert to a user may be invoked.

For example, a current full charge capacity of 4000 mAh would be less than a full charge capacity at last calibration of 4500 mAh minus a maximum allowable decay level of 400 mAh, and would result in the flow proceeding to block 114. In another example, if a current full charge capacity was 4200 mAh, flow would proceed or loop to block 102, or otherwise exit the process.

In an example, block 114 may include calibrating a battery, or triggering or prompting a user to calibrate a battery such as with an on-screen alert, status light, audible signal, e-mail, or other alert. Battery calibration may include fully discharging and fully recharging a battery, or other calibration routine as determined or needed by the particular battery technology.

According to some examples, block 114 may include a test to determine if a battery has reached the battery's end of life (or "end-of-battery-life"). For example, a full charge rapacity of less than 80% may be defined as the battery being at an end of life stage, where calibration is not needed or useful. In such examples, block 114 may suppress calibration, and in some examples may disable the flow of FIG. 1 from running.

In some examples, the flow may continue such that a determination is made as to whether a calibration cycle occurred. If the calibration occurred, the full charge capacity at last calibration may be updated, e.g., in memory.

Figure 2:
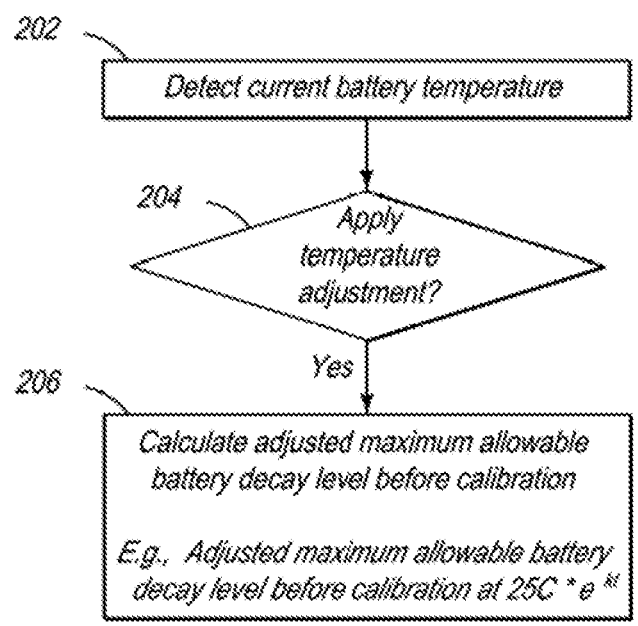
FIG. 2 is a flowchart for applying a temperature adjustment to calculate a maximum allowable battery decay level before calibration, according to an example of the present disclosure.

FIG. 2 is a flowchart for applying a temperature adjustment to calculate a maximum allowable battery decay level before calibration, according to an example of the present disclosure. With some battery technologies, battery decay may be approximately linear at a certain temperature, but increase as temperature increases. For example, LiION battery decay may be approximately linear at (or below) 25 degrees Celsius, but increase at temperatures above 25 degrees Celsius.

Accordingly, the calculation of block 110 discussed above may be adjusted or augmented to account for variations in temperature. In block 202, a current battery temperature, e.g., 40 degrees Celsius, may be detected. Temperature may be sensed by any temperature-sensing device or instrument, such as a PMIC or a module or device connected or coupled to a PMIC or other processor. In some examples, an average of battery temperatures, or average of recent battery temperatures over a period of time, may be fetched from, e.g., memory, and used in place of the current battery temperature.

In block 204, if the current battery temperature is above a threshold, e.g., temperature where decay is no longer linear such as the example of 25 degrees Celsius so LiION technology, flow may proceed to block 206.

In block 206, an adjusted maximum or allowable battery decay level before calibration may be calculated, based on the temperature detected in block 202. In an example, the calculation of block 206 may be an exponential approximation such as $y(t)=a*e^{kt}$. In an example, t may be the current temperature of the battery; a may be the battery decay at a certain temperature such as 25 degrees Celsius, which may have been calculated earlier in block 110; and k may be a constant based on the battery specification, such as 0.01, which may vary by battery chemistry.

In such an example, the exponential factor "kt" may be defined to match the decay curve of the battery over temperature, with a larger value of k resulting in a higher decay rate. Since the maximum allowable decay level is calculated iron) the last calibration cycle capacity, in an example, an approximation may only be necessary for the error cycle count period as determined from, e.g., a PMIC nominal error, therefore limiting the amount of error in the approximation.

In the example of block 110 from FIG. 1, an error cycle count of 40 may be divided by a design cycle count of 500, and multiplied by a full charge capacity at last calibration of 5000 mAh to result in a maximum allowable decay level of 400 mAh. In block 206, the maximum allowable decay level of 400 mAh may be updated or adjusted by the formula of $a*e^{kt}$. For example, $400\ mAh*e^{(0.01*(40-25))}$, winch equals an adjusted maximum allowable decay level of 465 mAh at 40 degrees Celsius, may be output from block 206.

In some examples, the adjusted maximum allowable decay level of 465 mAh may be fed back to, e.g., block 110 of the flow of FIG. 1.

Figure 3:
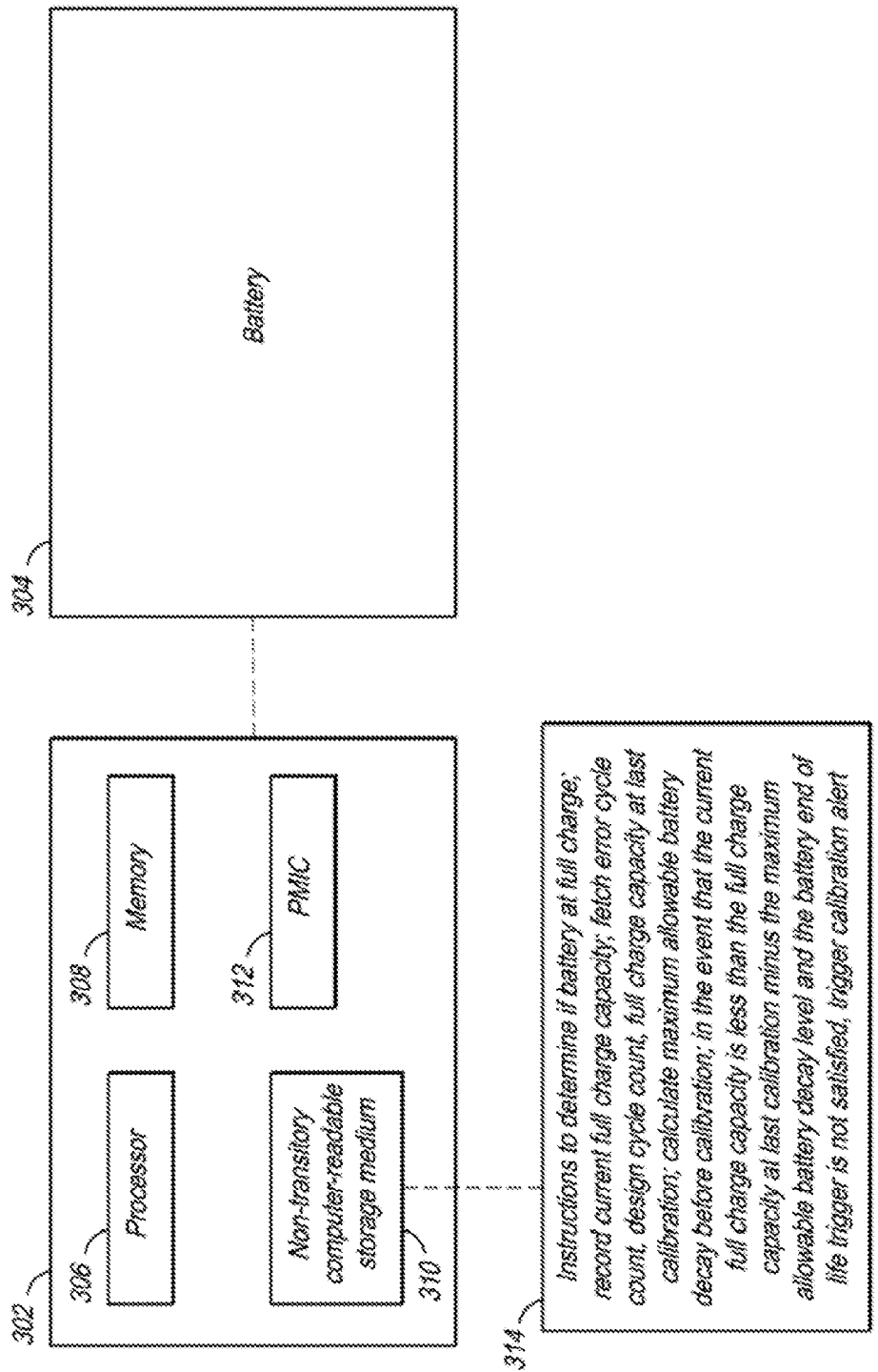
FIG. 3 illustrates a device for calculating a maximum allowable battery decay level before calibration, according to an example of the present disclosure.

FIG. 3 illustrates a device for calculating a maximum allowable decay level before calibration, according to an example of the present disclosure.

In an example, device 302 may be a device which uses portable power, such as the laptop computers, tablets, mobile devices, and other portable devices discussed herein. Device 302 may comprise a battery 304, which may be an external, internal, or integrated battery, or other battery capable of supplying power to device 302. In some examples, battery 304 may be a LiION battery.

Device 302 may comprise processing resource 306 such as a processor, CPU, embedded controller, or other processor, and a memory 308, such as a RAM, Flash memory, or other memory storage. Device 302 may also comprise a PMIC or other device capable of communicating with battery 304, including for measuring or detecting, or receiving via a communication module, a charge level, cycle, temperature, or other values related to battery 304. Device 302 may also have an output, such as a connection to a display, status lights, speaker, or other output, to signal a calibration alert or other message to a user.

Processor 306 and/or PMIC 312 may carry out instructions stored on non-transitory computer-readable storage medium 310. Each of these components may be operatively coupled to a bus.

Some or all of the operations set forth in the figures may be contained as a utility, program, or subprogram in any desired computer readable storage medium, or embedded on hardware. The computer readable medium may be any suitable medium that participates in providing instructions to the processing resource 306 or PMIC 312 for execution. For example, the computer readable medium may be non-volatile media, such as an optical or a magnetic disk, or volatile media, such as memory. The computer readable medium may also store other machine-readable instructions, including instructions downloaded from a network or the internet. In addition, the operations may be embodied by machine-readable instructions. For example, they may exist as machine-readable instructions in source code, object code, executable code, or other formats.

Instructions 314 may include, for example, instructions to determine if battery 304 is at full charge; to record the current full charge capacity; to fetch an error cycle count, a design cycle count, and a full charge capacity at last calibration; to calculate a maximum allowable battery decay before calibration; and, in the event that the current bill charge capacity is less than the full charge capacity at last calibration minus the maximum allowable battery decay level and the battery end of life trigger is not satisfied, to trigger a calibration alert.

In certain examples, some or all of the processes performed herein may be integrated into a firmware or as operating system. In certain examples, fee processes may be at least partially implemented in digital electronic circuitry, an computer hardware, in machine readable instructions (such as firmware and/or software), or in any combination thereof.

The above discussion is meant be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for providing a battery calibration alert, comprising:
    detecting, using a processing resource communicatively coupled to a battery, a charge level of the battery;
    in response to detecting a battery at a full charge, recording a current full charge capacity of the battery using the processing resource;
    fetching, from a memory, an error cycle count, a design cycle count, and a full charge capacity at a last calibration using the processing resource;
    calculating, using the processing resource, a maximum allowable battery decay level before calibration based on the error cycle count, the design cycle count, and the full charge capacity at last calibration; and
    in the event that the current full charge capacity is less than the full charge capacity at the last calibration minus the maximum allowable battery decay level before calibration, triggering a battery calibration using the processing resource.

2. The method according to claim 1, wherein calculating the maximum allowable battery decay level further comprises dividing the error cycle count by the design cycle count, and then multiplying by the full charge capacity at last calibration.

3. The method according to claim 1, further comprising detecting a current battery temperature and applying a temperature adjustment to the calculated maximum allowable battery decay level.

4. The method according to claim 3, wherein the temperature adjustment is based on a decay curve of the battery over temperature.

5. The method according to claim 1, further comprising performing a full discharge and a full recharge of the battery.

6. The method according to claim 5, further comprising updating the full charge capacity at last calibration.

7. A system for battery calibration, comprising:
    a memory;
    a processing resource communicatively coupled to a battery; and
    a temperature-sensing resource communicatively coupled to the battery and to the processing resource;
    wherein the temperature-sensing resource is to record a current temperature of the battery in the memory, and
    wherein the processing resource is programmed to detect and record in the memory the current capacity of the battery at full charge; fetch from the memory an error cycle count, a design cycle count, and a full charge capacity detected at a previous calibration; and calculate an expected battery decay level based on the current temperature of the battery, the error cycle count, the design cycle count, and the full charge capacity detected at a previous calibration.

8. The system of claim 7, wherein the processing resource is to further calculate an expected battery decay level based on an exponential approximation.

9. The system of claim 8, wherein the exponential approximation comprises a battery decay level at a set temperature and a constant based on a specification of the battery.

10. The system of claim 7, wherein the processing resource is to output a calibration alert in the event that the current capacity of the battery at full charge is less than the full charge capacity at a last calibration minus the expected battery decay level.

11. A non-transitory computer readable storage medium on which is stored a computer program for providing a battery calibration alert, said computer program comprising a set of instructions to:
    record a current full charge capacity of a battery;
    fetch an end-of-battery-life trigger, an error cycle count, a design cycle count, and a full charge capacity at a last calibration of the battery;
    calculate a maximum allowable battery decay level based on the error cycle count, the design cycle count, and the full charge capacity at last calibration; and
    in the event that the current full charge capacity is less than the full charge capacity at the last calibration minus the maximum allowable battery decay level and an end-of-battery-life trigger is not satisfied, cause a battery calibration alert to be triggered.

12. The computer readable storage medium of claim 11, wherein the end-of-battery-life trigger comprises a minimum full charge capacity percentage.

13. The computer readable storage medium of claim 11, wherein the error cycle count comprises a number of cycles to reach a nominal error level.

14. The computer readable storage medium of claim 11, wherein the design cycle count is based on a battery specification.

15. The computer readable storage medium of claim 11, wherein the battery calibration comprises a full discharge and a full charge of the battery.

* * * * *

UNITED STATES PATENT AND TRADEMARK OFFICE
CERTIFICATE OF CORRECTION

| | | |
|---|---|---|
| PATENT NO. | : 10,367,237 B2 | Page 1 of 1 |
| APPLICATION NO. | : 15/540040 | |
| DATED | : July 30, 2019 | |
| INVENTOR(S) | : John Landry et al. | |

It is certified that error appears in the above-identified patent and that said Letters Patent is hereby corrected as shown below:

On the Title Page

Column 2, item (57), Abstract, Line 1, after "battery" insert -- is --, therefor.

Signed and Sealed this
First Day of October, 2019

Andrei Iancu
*Director of the United States Patent and Trademark Office*